United States Patent Office 3,636,167
Patented Jan. 18, 1972

3,636,167
TREATMENT OF ACETYLENIC GLYCOLS
Robert J. Tedeschi, Whitehouse Station, and Herbert C. McMahon, Basking Ridge, N.J., assignors to Air Products and Chemicals, Inc., Allentown, Pa.
No Drawing. Filed Nov. 14, 1969, Ser. No. 877,035
Int. Cl. C07c 33/04, 33/06, 35/02
U.S. Cl. 260—638 Y                                   7 Claims

ABSTRACT OF THE DISCLOSURE

Acetylenic carbinols are prepared from acetylenic glycols by continuously adding distillation residues from reactions between an acetylenic hydrocarbon and a carbonyl compound to a slurry of an alkali metal carbonate in mineral oil maintained at elevated temperatures and reduced pressures whereby cleavage of the glycols is effected and the resultant acetylenic carbinols are recovered.

---

Various methods already are known for producing acetylenic carbinols by interreacting acetylenic hydrocarbons and a carbonyl compound in the presence of alkaline substances such as metallic sodium, sodium alcoholates and potassium hydroxide, and in the presence of a reaction medium. Under practically all conditions, however, the reaction proceeds further with the formation of substantial amounts of acetylenic glycols when a second mole of the carbonyl compound reacts with the desired acetylenic carbinol. For example, the synthesis of both hexynol and ethyl octynol by the reaction of acetylene with butyraldehyde and 2-ethylhexaldehyde, respectively, has resulted in large accumulations of high-boiling distillation residues consisting mainly of acetylenic glycols.

In view of the greater value of the acetylenic carbinols, a method for the conversion of these acetylenic glycols to the corresponding acetylenic carbinols would be of considerable value since it would not only permit recovery of the desired acetylenic carbinol but also the starting carbonyl compound, which could then be recycled.

It has been proposed in Vaughn U.S. Pat. 2,175,581 issued Oct. 10, 1939 to convert acetylenic glycols to the corresponding acetylenic carbinols by reacting the former "preferably under atmospheric pressure or under sub-atmospheric pressure, at an elevated temperature around its boiling point or thereabove." The methods taught by the Vaughn patent involve heating the acetylenic glycols "in the presence of a few percent of a weakly basic compound to promote pyrolysis" in a strictly batch, liquid phase operation which is extremely slow and time-consuming, or more rapidly in vapor phase operations "wherein the vapors of the acetylenic glycols are passed over an inert material such as sand, glass or porous filter stone maintained at a suitable elevated temperature in a reaction tube." Both of these operations have substantial drawbacks and disadvantages.

It is the object of this invention to provide an improved process for preparing acetylenic carbinols.

It is another object of this invention to provide an improved method for the conversion of acetylenic glycols, formed as by-products in the preparation of acetylenic carbinols by the reaction of acetylenic hydrocarbons with carbonyl compounds, to the desired acetylenic carbinols.

It is a further object of this invention to provide an improved method whereby the acetylenic glycols formed as by-products in the preparation of acetylenic carbinols by the reaction of acetylenic hydrocarbons with carbonyl compounds can be continuously and selectively cleaved to recover the desired acetylenic carbinols and the starting carbonyl compound which can then be recycled.

These, and other objects will appear more clearly from the detailed specification which follows.

It has now been found that the acetylenic glycols formed as by-products in the production of acetylenic carbinols by the reaction of acetylenic hydrocarbons with carbonyl compounds can be selectively cleaved to the desired acetylenic carbinols and the carbonyl feed component by continuously feeding the distillation residues composed mainly of such by-product glycols to a suspension of a suitable alkaline compound in a suitable liquid reaction medium. The cleavage reaction is preferably conducted below atmospheric pressure and at temperatures not substantially above the boiling point of the acetylenic carbinol cleavage product under the particular reaction pressure used. The liquid reaction medium should not only be inert but also should be free of constituents which are volatile under the cleavage reaction conditions in order to avoid interference with the recovery or fractionation of the cleavage products.

The preparation of acetylenic carbinols by interreacting acetylene with a carbonyl compound, originally proposed by Favorsky and improved upon by several other workers, is well-described in the literature. Reference is made, in this connection, to the book "Acetylenic Compounds" by Thomas F. Rutledge (Reinhold Book Corp. 1968), especially pages 146 to 149, and to the footnotes referred to therein.

While the preferred acetylenic hydrocarbon is acetylene, it is to be understood that other acetylenic hydrocarbons, e.g. diacetylene, can be employed in the production of acetylenic carbinols, the acetylenic glycol by-products of which are advantageously cleaved by the process of this invention.

The carbonyl compounds that can be reacted with these acetylenic hydrocarbons to produce such carbinols and glycol by-products may be represented by the general formula

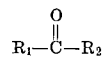

wherein $R_1$ and $R_2$ may be the same or different radicals selected from the group consisting of hydrogen; methyl, ethyl, propyl, butyl, isopropyl, isobutyl, tertiary butyl, methyl butyl, ethyl butyl, hexyl, methyl hexyl, and like alkyl groups containing from 1 to 12 carbon atoms; cycloalkyl such as cyclopropyl, cyclohexyl and like cycloalkyl groups containing from 3 to 10 carbon atoms; aryl such as phenyl, xylyl, tolyl and like aryl groups containing 6 to 12 carbon atoms; hydroxyalkyl such as hydroxymethyl, hydroxyethyl and like groups containing 1 to 20 carbon atoms; hydroxycycloalkyl such as hydroxycyclohexyl and like groups containing 3 to 10 carbon atoms; alkoxyalkyl such as methoxymethyl, methoxyethyl, ethoxybutyl and like groups containing 3 to 12 carbon atoms; and alkoxycycloalkyl such as methoxycyclohexyl, propoxycyclopentyl and like groups containing 4 to 12 carbon atoms.

In a typical acetylenic carbinol production operation a carbonyl compound and an acetylenic hydrocarbon are reacted in an acetal or an ether or other suitable inert reaction medium at substantially atmospheric pressure at a temperature of about 0 to about 50° C., using an alkali metal hydroxide, preferably solid KOH, as catalyst. The alkali metal hydroxide is used in an amount which is substantially stoichiometric (usually slightly in excess) with respect to the carbonyl compound. The acetylene hydrocarbon is generally used stoichiometrically or in slight excess with respect to the carbonyl compound. Under the usual conditions applied the reaction proceeds further than desired with the carbonyl compound forming some of the corresponding acetylenic glycol. For example, when using acetylene as the acetylenic hydrocarbon and butyraldehyde or 2-ethylhexaldehyde as the carbonyl compound, mixtures of reaction products, e.g. of 1-hexyn-3-ol and 5-decyn-4,7-diol or of 4-ethyl-1-octyn-3-ol and 1,10 - diethyl - 7-tetradecyn-6,9-diol are obtained which vary in composition somewhat depending upon the specific reaction conditions. The ratio of the acetylenic carbinol to the acetylenic glycol usually lies within the range of 5:1 to 1:4, and most commonly is about 1:1 to 4:1. Distillation of the reaction products will normally remove the major proportion of the acetylenic carbinol, yielding a residue or still bottoms containing the by-products of the reaction, consisting principally of the corresponding acetylenic glycols, e.g. the ratio of carbinol to glycol is usually in the ratio of 1:10 to 2:5 but the amount of glycol may be greater or less, depending on the efficiency of the distillation the objective of which is to remove all of the carbinol. It is the treatmen of said residues or still bottoms to selectively cleave such acetylenic glycols to the corresponding acetylenic carbinols, the desired reaction products, and the corresponding carbonyl feed component which would be suitable for recycling to the reaction zone for reaction with acetylenic hydrocarbons, that is the subject matter of the process of this invention.

The general procedure for cleaving the acetylenic glycols contained in the aforesaid still bottoms is to add the same continuously to a suspension of an alkaline compound in a suitable liquid reaction medium which is vigorously agitated while adjusting the vacuum and temperature conditions to facilitate the removal of the acetylenic carbinol as soon as it is formed. Prolonged contact of the acetylenic carbinol with the alkaline cleavage medium substantially increases the chances of its being further cleaved to the original acetylenic hydrocarbon and carbonyl reaction components. High temperatures can also cause such further cleavage. Accordingly, the cleavage reaction is conducted below atmospheric pressure, generally below 100 mm. Hg and preferably below 50 mm. Hg and at temperatures not more than about 25–50° C. above the boiling point of the acetylenic carbinol cleavage product under the pressure maintained in the cleavage reaction zone.

Alkaline compounds that can be used as catalysts to effect the desired cleavage include $K_2CO_3$, $Na_2CO_3$, basic clays (pH>9), alkaline earth carbonates, and other weakly alkaline compounds, potassium carbonate being preferred. The reaction medium may be any high boiling liquid that is inert in the cleavage reaction and which has no fractions boiling under the temperature and pressure conditions maintained during the cleavage reaction. Mineral oils are especially suitable, preferably medicinal grade oil having no fractions boiling below 200° C. at 0.5 mm. Hg. The alkaline compound is maintained as a suspension or slurry by suitable agitation in the liquid reaction medium. From about 10 to about 50 weight percent, preferably about 15 weight percent of the catalyst, e.g. an alkali metal carbonate, is maintained in the liquid reaction medium.

Apparatus for carrying out the process of this invention will readily occur to those skilled in the art since it merely requires a well-agitated reaction vessel to which the still bottoms can be continuously added, means for applying the desired vacuum and temperature conditions, and suitable means for condensing the vaporous effluent withdrawn from the reaction vessel by the vacuum producing unit.

The following examples are illustrative of the present invention:

EXAMPLE I

Hexynol (1-hexyn-3-ol) was prepared by reacting acetylene with an excess of butyraldehyde in an ether solvent containing about 15 weight percent of potassium hydroxide at atmospheric pressure and at about 15–20° C. A sample of the resultant reaction mixture, stripped of ether was distilled (final pot temperature 165° C. and about 2 mm. Hg) to remove any residual ether and hexynol. The resultant still bottoms contained 81.5% decyndiol by gas chromatography.

224.5 g. of mineral oil was charged to a 500 ml. resin kettle equipped with a stirrer, addition funnel, thermometer and a take-off tube. Attached to the take-off tube was a three-necked flask equipped with condensers and a vacuum pump. Potassium carbonate (22.4 g.) was added to the mineral oil with vigorous stirring and the mixture was brought to 165° C. at about 50 mm. Hg. Under these conditions, the still bottoms were added dropwise over a period of about 2 hours. The material recovered contained approximately 50.5% hexynol and 167 butyraldehyde.

EXAMPLE II

Ethyl octynol (4-ethyl-1-octyn-3-ol) was prepared by reacting acetylene with an excess of 2-ethylhexaldehyde in an ether solvent containing about 15 weight percent of potassium hydroxide at atmospheric pressure and at about 15–20° C. The resultant reaction mixture was stripped of ether and distilled (final pot temperature 150° C. and about 45 mm. Hg to remove any residual ether and the ethyl octynol. The resultant still bottoms contained more than 80% of the corresponding glycol (5,10 - diethyltetradec-7-yne-6,9-diol). The total amount of still bottoms obtained which were subjected to cleavage was 1096.5 g.

The cleavage reaction was carried out in a 500 ml. resin kettle equipped with an addition funnel, stirrer, thermometer, and a 24/40 vapor take-off side arm. The reactor was well insulated and heated with a tape wrapped around the body. The side arm was sloped downward to a 500 ml. three-neck flask wherein most of the cleavage liquids collected. The vacuum train exited said flask through an upright water cooled condenser, then through two Dry Ice traps before entering the vacuum pump.

150 g. of mineral oil was added to the 500 ml. resin kettle together with 25 g. of powdered $K_2CO_3$. This suspension was heated to 175° C. and 45–50 mm. Hg with vigorous stirring. At these conditions the boiling point of ethyl octynol is exceeded by approximately 40–50° C. The addition funnel was charged with 250–310 mls. of the still bottoms and was adapted to deliver this material below the surface of the body of mineral oil. Initially 25 mls. of the bottoms were added over a 20 minute period after which the addition was halted until distillate began to collect in the three-neck flask (about 20 minutes). Excessive foaming and accompanying carry-over of the carbonate was prevented by this technique. The addition rate was gradually increased thereafter. The 1096.5 g. of ethyl octynol still bottoms were selectively cleaved in four successive runs during which no additions or subtractions were made to the original weight of either the potassium carbonate or the mineral oil. The results obtained are summarized in Table I.

TABLE I

| Run: | Bottoms added, grams | Time, minutes | Total cleavage product (grams) | Percent $C\equiv C-H$ as ethyl octynol |
|---|---|---|---|---|
| 1 | 276.5 | 120 | 263.5 | 46.4 |
| 2 | 263.0 | 85 | 248.0 | 40.4 |
| 3 | 274.0 | 75 | 254.5 | 39.4 |
| 4 | 283.0 | 55 | 265.5 | 40.4 |
| Total | 1,096.5 | | 1,031.5 | |

Note.—pH of cleavage products—6 (by paper).

A 966.5 portion of the combined cleavage product was distilled as shown in Table II.

TABLE II

| Boiling range (° C.) | Pressure (mm. Hg) | Reflux ratio | Fraction (grams) | Product |
|---|---|---|---|---|
| 60–91.2 | 80 | 2:10 | 14 | Forerun. |
| 91.2–92.0 | 79 | 5:5 | 459.5 | Et. hexaldehyde. |
| 67.5–98.5 | 19.5 | 2:10 | 16.5 | Intermediate (yellow). |
| 98.5–100 | 19.5 | 5:5 | 383 | Ethyl octynol. |

NOTE.—Bottoms—81 grams; Traps—12 grams (mostly H₂O).

Based on the original weight of bottoms reacted, 44.8% was recovered as ethyl hexaldehyde and 37.4% as ethyl octynol. The weight ratio of ethyl octynol to ethyl hexaldehyde would be 54.6% to 45.4% if only selective cleavage took place. Secondary cleavage of ethyl octynol to acetylene and ethyl hexaldehyde would tend to increase the ratio in favor of ethyl hexaldehyde at the expense of the ethyl octynol. The structure of the above products were confirmed by IR.

It will be understood that the present invention is not limited to the foregoing examples since numerous variations will readily occur to those skilled in the art without departing from the scope of the following claims.

We claim:

1. The process of preparing an acetylenic carbinol comprising reacting an acetylenic hydrocarbon with a carbonyl compound represented by

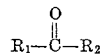

wherein $R_1$ and $R_2$ are the same or different radicals selected from the group consisting of hydrogen, alkyl containing from 1 to 12 carbon atoms, cycloalkyl containing from 3 to 10 carbon atoms, aryl containing 6 to 12 carbon atoms, hydroxyalkyl containing 1 to 20 carbon atoms, hydroxycycloalkyl containing 3 to 10 carbon atoms, alkoxyalkyl containing 3 to 12 carbon atoms and alkylcycloalkyl containing 4 to 12 carbon atoms, distilling the acetylenic carbinol from the reaction mixture to form still bottoms containing the corresponding acetylenic glycol, continuously adding said still bottoms to a vigorously agitated suspension of an alkali metal carbonate in a high boiling inert liquid medium maintained at subatmospheric pressure and a temperature not more than about 40–50° C. above the boiling point of the acetylenic carbinol at the reaction pressure thereby selectively cleaving said acetylenic glycol to the acetylenic carbinol and the carbonyl compound, and removing vapors of said acetylenic carbinol and said carbonyl compound as formed from said liquid medium.

2. The process as defined in claim 1, wherein the inert liquid medium is a mineral oil free of fractions boiling below 200° C. at pressures of from about 0.5 mm. to 100 mm. Hg.

3. The process as defined in claim 2, wherein the alkali metal carbonate is potassium carbonate.

4. The process as defined in claim 1, in which the acetylenic carbinol is 1-butyne-3-ol prepared by the reaction of acetylene with acetaldehyde, the liquid medium is a mineral oil free of fractions boiling below 200° C. at pressures of from 200 to 400 mm. Hg and the alkali metal carbonate is potassium carbonate.

5. The process as defined in claim 1, in which the acetylenic carbinol is 1-hexyn-3-ol prepared by the reaction of acetylene with butyraldehyde, the liquid medium is a mineral oil free of fractions boiling below 200° C. at pressures of from 10 to 100 mm. Hg and the alkali metal carbonate is potassium carbonate.

6. The process as defined in claim 1, in which the acetylenic carbinol is 1-octyn-3-ol prepared by the reaction of acetylene with hexaldehyde, the liquid medium is a mineral oil free of fractions boiling below 200° C. at pressures of from 10 to 100 mm. Hg and the alkali metal carbonate is potassium carbonate.

7. The process as defined in claim 1, in which the acetylenic carbinol is 4-ethyl-1-octyn-3-ol prepared by the reaction of acetylene with ethyl hexaldehyde, the liquid medium is a mineral oil free of fractions boiling below 200° C. at pressures of from 10 to 100 mm. Hg and the alkali metal carbonate is potassium carbonate.

References Cited

UNITED STATES PATENTS

| 2,175,581 | 10/1939 | Vaughn | 260—642 |
| 2,385,547 | 9/1945 | Smith | 260—638 Y |
| 3,108,140 | 10/1963 | Leeds et al. | 260—635 Y |
| 3,218,362 | 11/1965 | Moore | 260—638 Y |

FOREIGN PATENTS

| 661,724 | 4/1963 | Canada | 260—638 Y |
| 667,245 | 7/1963 | Canada | 260—638 Y |

OTHER REFERENCES

Leeds et al.: "Ind. and Eng. Chem., Product Research and Development," 1965, vol. 4, pages 236 to 243.

LEON ZITVER, Primary Examiner

J. E. EVANS, Assistant Examiner

U.S. Cl. X.R.

260—601 R, 615 R, 617 E, 618 E, 631 R, 635 Y, 637 R, 642

UNITED STATES PATENT OFFICE
CERTIFICATE OF CORRECTION

Patent No. 3,636,167          Dated January 18, 1972

Inventor(s) Robert J. Tedeschi and Herbert C. McMahon

It is certified that error appears in the above-identified patent and that said Letters Patent are hereby corrected as shown below:

Column 3, line 17 "treatmen" should be spelled --treatment--

Column 4, line 15 "167" should read --16%--

Column 5, line 40 "containuously" should be spelled --continuously--

Signed and sealed this 13th day of June 1972.

(SEAL)
Attest:

EDWARD M. FLETCHER, JR.
Attesting Officer

ROBERT GOTTSCHALK
Commissioner of Patents